(No Model.)

H. H., C. H., & C. BECKMAN.
Windmill.

No. 237,467. Patented Feb. 8, 1881.

WITNESSES:
Donn J. Turtchill
C. Sedgwick

INVENTOR:
H. H. Beckman
C. H. Beckman
C. Beckman
BY Munn & Co
ATTORNEYS.

UNITED STATES PATENT OFFICE.

HERMAN H. BECKMAN, CLAUMER H. BECKMAN, AND CHRIST BECKMAN, OF CLAYTON, IOWA.

WINDMILL.

SPECIFICATION forming part of Letters Patent No. 237,467, dated February 8, 1881.

Application filed September 22, 1880. (No model.)

*To all whom it may concern:*

Be it known that we, HERMAN H. BECKMAN, CLAUMER H. BECKMAN, and CHRIST BECKMAN, of Clayton, in the county of Clayton and State of Iowa, have invented a new and useful Improvement in Windmills, of which the following is a specification.

Figure 1:
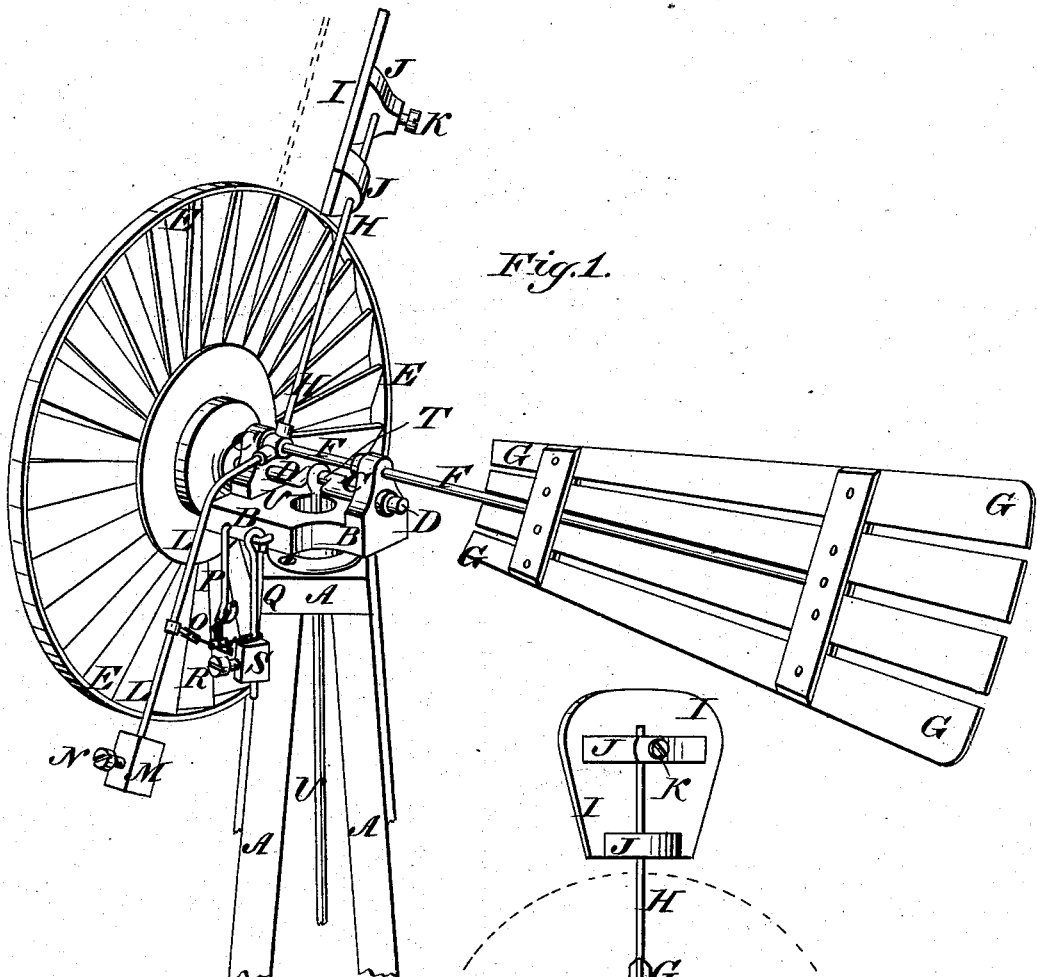
Figure 2:
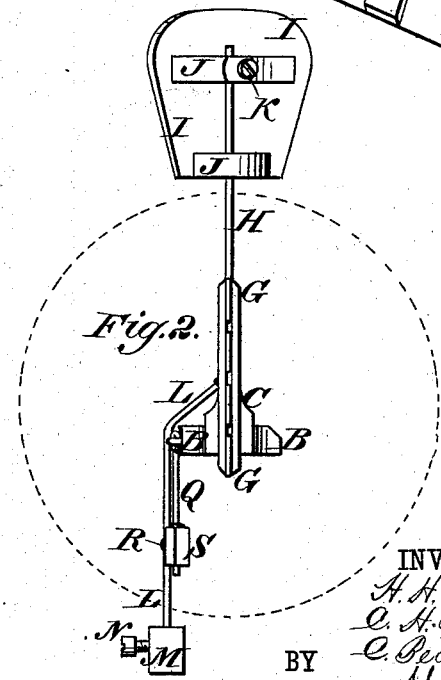

Figure 1 is a perspective view of the improvement. Fig. 2 is a rear elevation.

Similar letters of reference indicate corresponding parts.

The object of this invention is to furnish windmills so constructed that they will be thrown into and out of the wind automatically as the wind varies in force, and will always be in balance upon its support.

A represents the tower or other structure that supports the operating mechanism of the windmill, and to which is pivoted the turn-table B. To the turn-table B are attached bearings C, in which revolves the horizontal shaft D. To the forward end of the shaft D is attached the wind-wheel E, about the construction of which there is nothing new. In the upper part of the bearings C works a shaft, F, which is placed parallel with the shaft D, and has a large vane, G, attached to its rear end. To the forward part of the shaft F is rigidly attached a bar, H, at right angles with the said shaft F and in the same plane with the vane G. The rigid bar H is made of a length greater than the radius of the wind-wheel E, and to its outer end, beyond the circumference of the said wind-wheel E, is attached a vane, I, smaller than the vane G, and set parallel with the wings of the said wind-wheel E, as indicated by the dotted lines in Fig. 1.

The vane I may be adjustably attached to the bar H by bearings J and a set-screw, K, or by other suitable means, so that its position may be changed to give it greater or less power over the wind-wheel E, as required.

To the shaft F is rigidly attached the end of a rod, L, which inclines outward and downward until it has passed the side of the turn-table B, and is then bent downward into a vertical position, or a position parallel with the bar H, as shown in Figs. 1 and 2. To the lower part of the rod L is secured a weight, M, by a set-screw, N, or other suitable means, so that the said weight can be adjusted to give it more or less leverage, as may be required.

With this construction, as the force of the wind increases it forces the vane I downward toward one side, which movement of the vane I turns the vane G correspondingly out of the wind, or brings its edge more or less toward the wind, allowing the pressure of the wind against the smaller vane I to turn the wheel E more or less out of the wind as the wind varies in force. As the force of the wind decreases the gravity of the weight M overcomes the wind-pressure against the vane I, and raises the said vane, bringing the wind-wheel more into the wind, so that the wind-wheel will be revolved with uniform velocity however the force of the wind may vary.

The downward movement of the vane I is limited by a chain, O, one end of which is attached to the rod L, and its other end is attached to the lower end of a downwardly-projecting arm, P, the upper end of which is rigidly attached to the turn-table B. To the turn-table B is hinged the upper end of a rod, Q, to the lower part of which is secured, by a set-screw, R, or other suitable means, a weight, S. The lower part of the hinged rod Q is connected with the middle part of the chain O, so that as the wind increases in force and the vane I approaches its lower limit the weight S will be taken up and will hold the wheel in position to receive enough wind to keep the said wheel in motion.

Motion is communicated from the wheel-shaft D to the pump or other machinery to be driven by an eccentric or crank, T, formed upon or attached to the said shaft, and with which is connected the upper end of a rod, U, passing down through the support A to the machinery to be driven.

Having thus described our invention, what we claim as new, and desire to secure by Letters Patent, is—

In a windmill, the combination, with the shaft F, carrying the main vane G, the shaft D, parallel thereto and carrying the wind-wheel E, the bar H, carrying the small vane I, and the rod L, carrying the weight M, of the chain O, the rigid arm P, the hinged rod Q, and the adjustable weight S, whereby the downward movement of the small vane is limited, as set forth.

HERMAN HENRY BECKMAN.
CLAUMER HENRY BECKMAN.
CHRIST BECKMAN.

Witnesses:
J. H. SCHROEDER,
WM. BUHLMAN.